US007181460B2

United States Patent
Coss et al.

(10) Patent No.: US 7,181,460 B2
(45) Date of Patent: Feb. 20, 2007

(54) USER-DEFINED AGGREGATE FUNCTIONS IN DATABASE SYSTEMS WITHOUT NATIVE SUPPORT

(75) Inventors: Rafael Anselmo Coss, San Jose, CA (US); Knut Stolze, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 608 days.

(21) Appl. No.: 10/173,402

(22) Filed: Jun. 18, 2002

(65) Prior Publication Data

US 2003/0233380 A1 Dec. 18, 2003

(51) Int. Cl.
*G06F 17/30* (2006.01)

(52) U.S. Cl. ...................................... 707/100
(58) Field of Classification Search ............... 707/102, 707/1–3, 6, 100–104.1
See application file for complete search history.

(56) References Cited

U.S. PATENT DOCUMENTS

| | | | |
|---|---|---|---|
| 5,742,806 A | | 4/1998 | Reiner et al. |
| 5,963,936 A | * | 10/1999 | Cochrane et al. ............... 707/3 |
| 6,115,705 A | * | 9/2000 | Larson ............................ 707/3 |
| 6,240,465 B1 | | 5/2001 | Leach et al. |
| 6,496,834 B1 | * | 12/2002 | Cereghini et al. ........... 707/102 |
| 6,505,189 B1 | * | 1/2003 | On Au et al. .................... 707/2 |
| 6,519,604 B1 | * | 2/2003 | Acharya et al. ............. 707/102 |
| 2002/0019881 A1 | | 2/2002 | Bokhari et al. |
| 2003/0167278 A1 | * | 9/2003 | Baudel ........................ 707/102 |

OTHER PUBLICATIONS

T. Johnson, et al, "Extending Complex Ad-Hoc OLAP," ACM, Nov. 1999, pp. 170-179.

* cited by examiner

*Primary Examiner*—Debbie M. Le
(74) *Attorney, Agent, or Firm*—Sughrue Mion, PLLC

(57) ABSTRACT

A computer-implemented method of using a database management system (DBMS) for providing an aggregate of a plurality of entities, constructing an aggregate of said plurality of entities in a memory to provide a result, and returning the result from the memory. Constructing the aggregate in memory includes storing in the memory a plurality of intermediate aggregation results each associated with a unique identifier. The unique identifier for each intermediate result is stored in the DBMS. Each unique identifier indicates information identifying a position within a sequence of generating the intermediate result and a pointer to a location in the memory where that intermediate result is stored.

40 Claims, 5 Drawing Sheets

Geometric Shapes

Aggregate of Geometric Shapes

Aggregate of Geometric Shapes

Geometric Shapes

USER-DEFINED AGGREGATE FUNCTIONS IN DATABASE SYSTEMS WITHOUT NATIVE SUPPORT

BACKGROUND OF THE INVENTION

1. Field of the Invention

The invention relates to information processing and storage systems. More particularly, it relates to methods, apparatuses and articles of manufacture for manipulating information contained in a database system.

2. Description of the Related Art

An aggregate combines several entities into a single entity. In many database systems there is no support to define and implement user-defined aggregate functions.

For example, consider a table with a spatial column that contains several geometric shapes, one in each row. In database systems without native support for generating an aggregate there is no simple way to construct a single geometric value that represents the union of all the geometries in the column, or a subset thereof. FIGS. 1A and 1B illustrate an aggregate function. Each of the polygons 102 through 112 shown in FIG. 1A constitutes a single value in a database table in which each of the values is represented in a single row. A tabular representation for the polygons shown in FIG. 1A is shown below in Table 1, which shows rows having stored therein information for the polygon shape and other information related to that shape.

TABLE 1

| geometry | other columns |
|---|---|
| polygon1 | . . . |
| polygon2 | . . . |
| polygon3 | . . . |
| polygon4 | . . . |
| polygon5 | . . . |
| polygon6 | . . . |

An aggregation of the polygons shown in FIG. 1A can be described by equation 1 set forth below and is shown by shape 114 in FIG. 1B.

polygon1 union polygon2 union polygon3 union polygon4 union polygon5 union polygon6     Eq. 1

In more abstract terms, entities can be combined into an aggregate entity according to the following equation, Eq. 2, set forth below, where v1 . . . vn are values of type t, and op is an operation.

v1 op v2 op . . . op vn     Eq.2

A database system that implements recursive queries as defined in the SQL-99 standard (ISO/IEC 9075-2) provides the facilities to create aggregates. However, such solutions tend to be rather complex as recursion introduces its own set of complexities which are well-known and not described here. An example of the use of recursion to generate an aggregate is illustrated by the SQL-like statements shown in Table 2 below.

TABLE 2

```
WITH union_tab(result, row_no) AS (
    SELECT geometry, 1
    FROM table
    WHERE <first row>
    UNION ALL
    SELECT union (result, geometry), row_no +1
```

TABLE 2-continued

```
    FROM table, union_tab
    WHERE <next row, based on row_no>)
SELECT geometry
FROM union_tab
WHERE row_no =( SELECT MAX (row_no)
        FROM union_tab )
```

It is well-known how to establish correlations between various rows in a database when using recursive techniques. However, there are several drawbacks to those approaches. First, when using recursion an iteration over the rows is required, so some sort of unique counter is needed. Also, infinite loops can occur when using recursion, which cannot be easily, if at all, detected by the database management system (DBMS). Further, the technique shown in Table 2 is not useable in practice.

Accordingly, there is a need for user-defined aggregate functions for use with database systems that do not use recursive programming techniques.

SUMMARY OF THE INVENTION

In accordance with an aspect of the present invention, a computer implemented method provides an aggregate of a plurality of entities using a database management system (DBMS) that utilizes a memory external to the database in which the aggregate is constructed. Functions provided by the DBMS are used to construct the aggregate in the memory to provide a result. The result is returned from the memory to the DBMS and a counter is used to detect an identifier of the aggregate's location in the memory.

In accordance with a further aspect of the invention, a computer implemented method uses a database management system to successively generate an aggregate of a plurality of entities, wherein input entities are computed with results comprised of a combination of prior input entities to provide a successive aggregated result. An identifier is assigned to each successively aggregated result, and those identifiers include values assigned in ascending order. The identifier having the maximum number, which is indicative of the last combination formed, is identified and whereby the location of the last combination is identified.

Features and advantages as well as further aspects of the invention will become apparent upon consideration of the following descriptions and descriptive figures of specific embodiments thereof. While these descriptions go into specific details of the invention, it should be understood that variations may and do exist and would be apparent to those skilled in the art based on the descriptions herein.

DETAILED DESCRIPTION

Figure 1B:
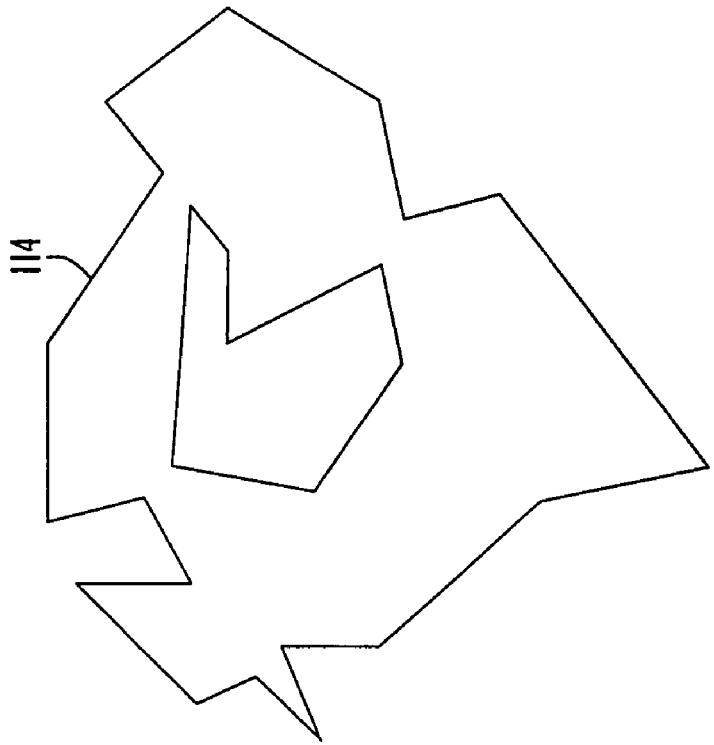
FIG. 1B shows an aggregate of the geometric shapes shown in FIG. 1A.
Figure 1A:
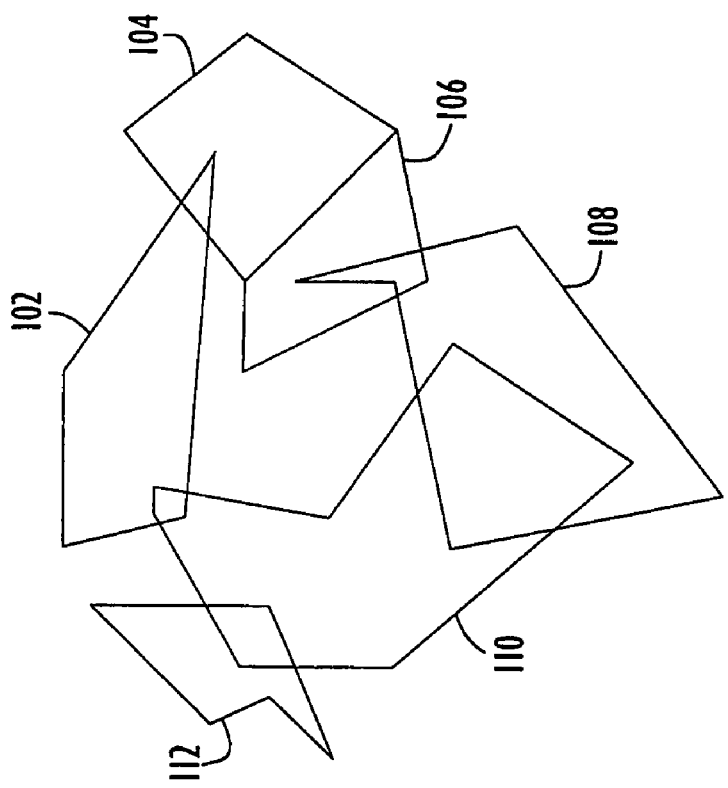
FIG. 1A depicts a plurality of geometric shapes stored in a database.

The embodiments described below are described with reference to the above drawings, in which like reference numerals designate like components.

Embodiments of the invention are described here in terms of aggregating geometric shapes. However, the invention is not limited to constructing such aggregates of spatial objects, which are described here only for purposes of illustration. Rather, the invention is broadly applicable to constructing aggregates of entities, which by way of non-limiting example in addition to geometric figures include various types of database records, sets of values or numbers, physical objects, etc.

A way to write the query shown in Table 2 to obtain exactly the same result, but without using recursion, is described here using two new functions called "ComputeAggregate" and "GetAggregateResults." Using structured query language (SQL) syntax, the following query shown in Table 3 can be used to obtain the same result that the query in Table 2 produces, but without using recursion.

TABLE 3

| | |
|---|---|
| SELECT | GetAggregateResult(MAX(ComputeAggregate(geometry))) |
| FROM | table |

The query shown in Table 3 constructs the aggregate in memory that is external to a database and exploits the database system's native aggregate functions (MAX, MIN, . . . ) to keep track of, find and retrieve the final result. The benefits of this approach are, besides greatly improved usability, enhancing performance by avoiding communication needed to construct and transfer intermediate results that are generated, and exploiting the grouping functionality of existing DBMSs, such as the DB® database system marketed by IBM. The query shown in Table 3 includes the two new functions: ComputerAggregate and GetAggregate Results.

Figure 2:
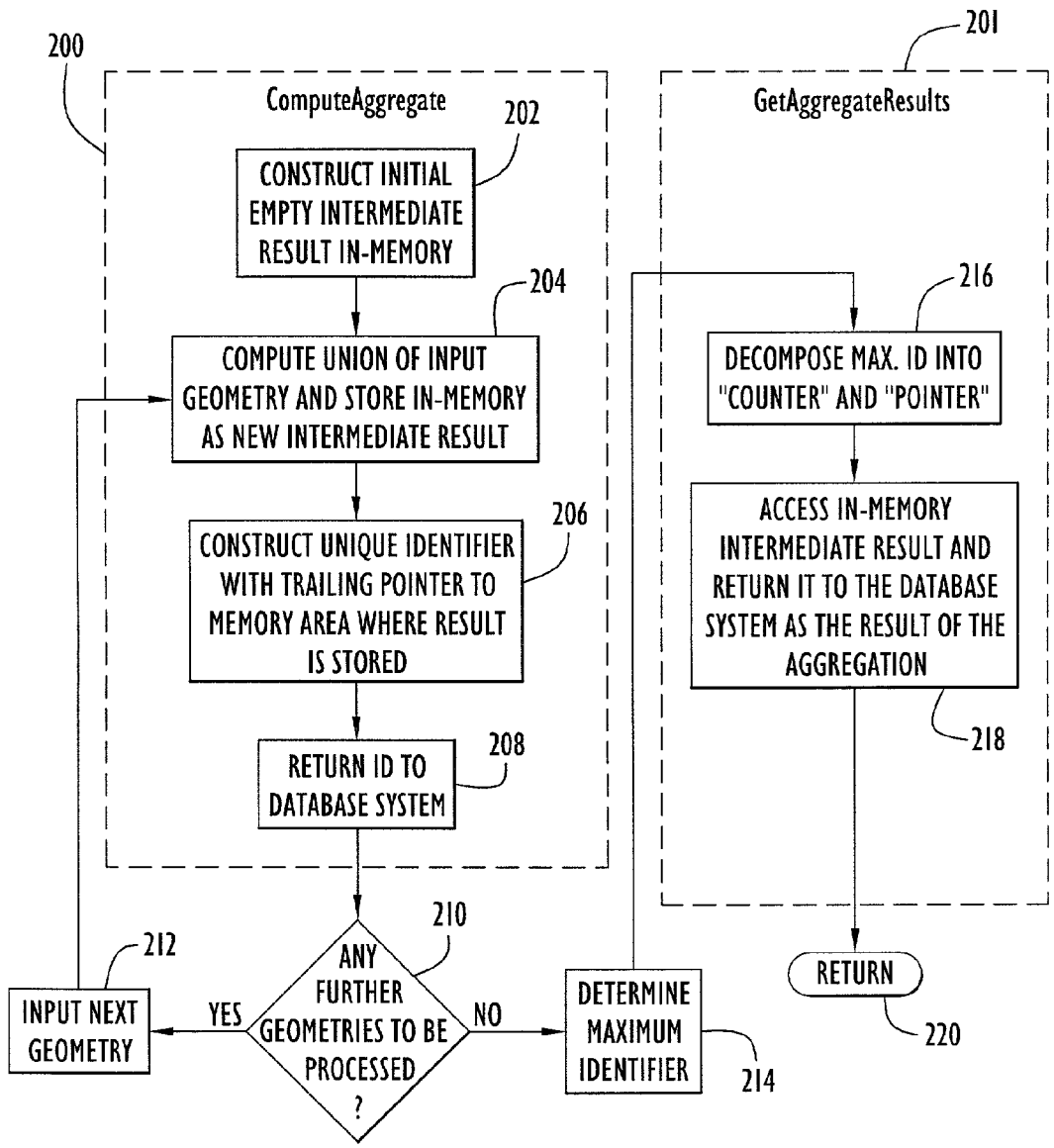
FIG. 2 is a flowchart illustrating a process for computing an aggregate and obtaining an aggregate result.

FIG. 2 shows a flowchart for processing the query shown in Table 3. The flowchart illustrates the use of the functions ComputerAggregate 200 and GetAggregateResult 201. The first call made to the ComputeAggregate function 200 performs the initialization. That is, it places the identity element for the aggregation operation into the memory area. The "identity element" is, for example, 0 (zero) for addition, 1 (one) for multiplication and an empty set for a union operation. This initialization is depicted in FIG. 2 by operation 202.

The function then enters a loop where it builds up an aggregate, keeping the intermediate results generated in each iteration of the loop in a variable stored in memory that is external to the database. Generally, the entities, or in this example, the geometric shapes, to be aggregated are held by the DBMS, most likely in a relational storage structure such as an internal table within the DBMS. The DBMS provides from that table the first entity, or shape, to be processed to the ComputeAggregate function 200. The ComputeAggregate function then applies the aggregate operation to that entity and then stores an intermediate result produced by applying the aggregation function to the entity, in the variable stored in memory as depicted by operation 204. The result of the operation becomes the new intermediate result. For the very first entity, this intermediate result will be a value of the entity itself because only the identity element is applied to it, which does not cause any change to the value.

In the example illustrated in FIG. 2, operation 204 computes the union of the geometric shape produced by the database and stores the computed intermediate result in the variable stored in memory. The first time operation 204 is executed the intermediate result contains the empty set. Accordingly, the union of the first geometric entity and the empty set generates an intermediate result that merely is the first geometric entity.

Each time an intermediate result is produced it is stored in the variable in memory by the ComputeAggregate function. The location where the intermediate result is stored in memory can change each time through the loop, because of, for example, system storage management features of the computing system such as reallocation of memory spaces, etc. In order to locate the intermediate result in the memory an identifier that indicates the location of that intermediate result is generated and returned to the DBMS. The ComputeAggregate function 200, in operation 206, constructs the unique identifier for the intermediate result that was generated in operation 204. That identifier is then returned to the database system, as indicated in operation 208. Many database systems store returned values in a sequential manner, such as by storing those returned values in a table. Here, the identifier returned to the DBMS is stored in such a sequential matter, such as in a table, along with other previously returned identifiers.

Figure 3A:
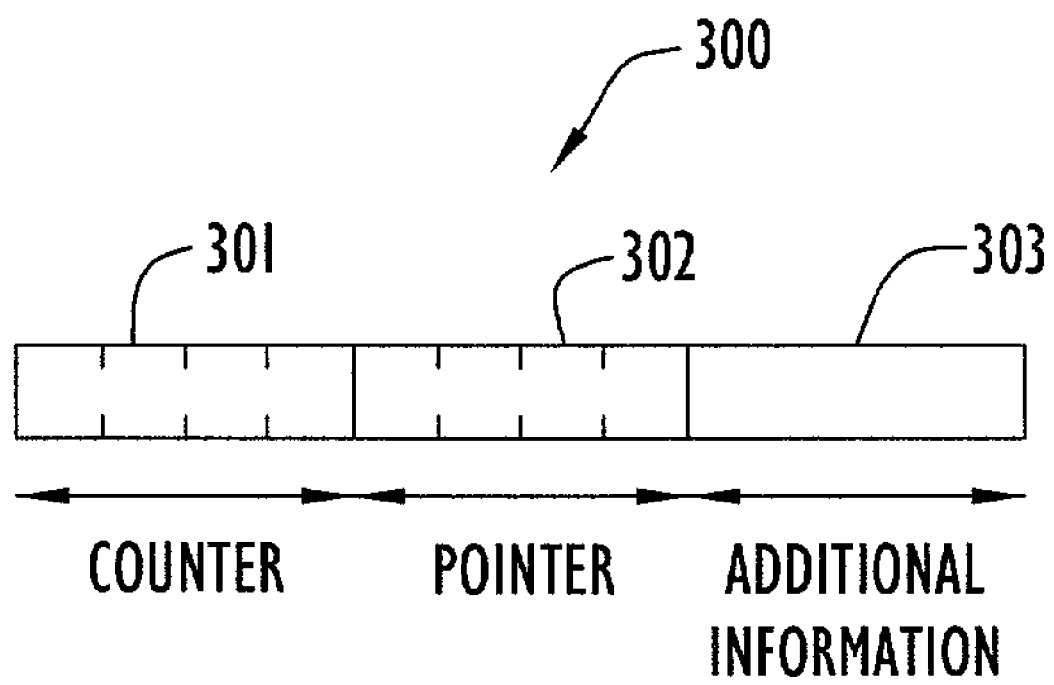
FIG. 3A shows an embodiment of an aggregate identifier used in the process illustrated in the flowchart of FIG. 2.

An example of such a unique identifier is shown in FIG. 3A, and includes a counter portion 301, a pointer portion 302, and an additional information portion 303. A counter generates a sequential count value for each generated intermediate result. That count value is placed in the counter portion 301 of the unique identifier 300. The count value uniquely identifies an intermediate result because the counter generates a new sequential count value for each intermediate result that is generated in the loop. The count value identifies that the unique identifier corresponds to the n-th intermediate result. Placing the count value as the first entry in the identifier allows the DBMS to use it as criteria for sorting and filtering the identifiers that are stored by the DBMS. The pointer portion 302 contains a pointer to the location in the memory where the corresponding intermediate result is stored.

The pointer can include several pieces of information to uniquely identify where the intermediate result can be found. For example, the first piece of pointer information can be a host identifier (machine name) if used in a distributed processing system. The second piece of pointer information can be a process identifier or a shared memory identifier. This is to ensure that the function that returns the final result to the DBMS actually accesses the correct memory area. The third piece of pointer information can be offset into the memory or a structure mapped onto the memory area to identify exactly where the intermediate result can be found. The "additional information" portion 303 of the identifier can include additional information which, if necessary, can be determined on a case by case basis depending on the application.

Figure 3B:
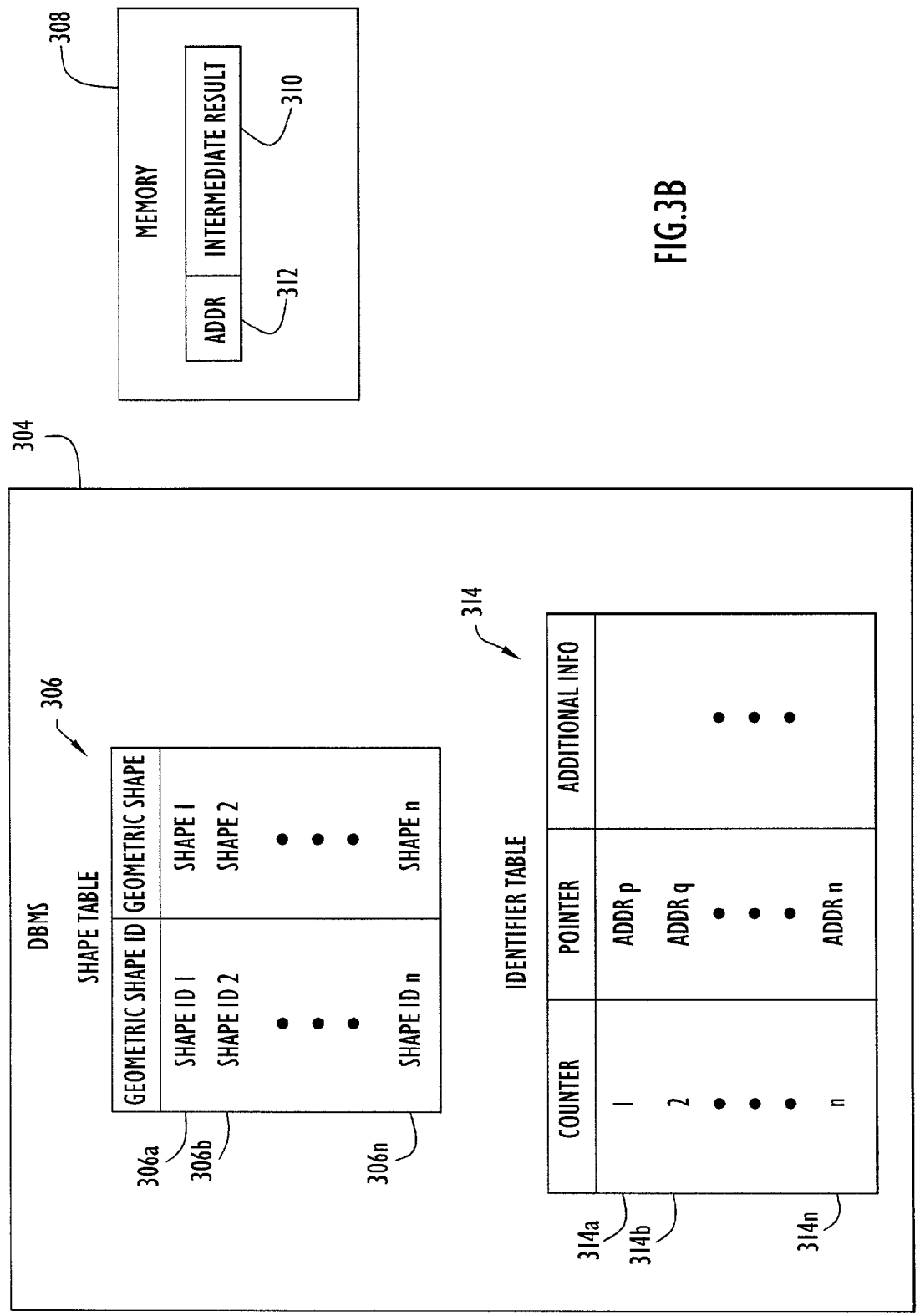
FIG. 3B shows a storage arrangement for storing the geometric shapes, the aggregate identifiers, and an intermediate aggregate result.

FIG. 3B illustrates data structures that hold the data items used in computing a union of shapes according to the process illustrated in FIG. 2. In FIG. 3B, the DBMS 304 includes a shape table 306 in which the geometric shapes to be processed are held. Each shape is associated with a geometric shape identifier (ID) that identifies the shape. As shown in FIG. 3B, n geometric shapes 306a through 306n are stored in shape table 306. When an intermediate result 310 is computed, it is stored in a variable in memory 308. The variable is associated with a memory address 312. Since the location of the intermediate result can change due to the dynamics of the computing system, an identifier 300, as shown in FIG. 3A, is generated for each intermediate result and returned to the DBMS. The DBMS receives the returned identifiers for the intermediate results and stores those identifiers in an identifier table 314. In FIG. 3B, n identifiers 314a through 314n, corresponding to n intermediate results, are stored in the identifier table 314. The pointer field in an identifier points to the location in memory where the intermediate result is located.

Referring again to FIG. 2, in operation 210 the DBMS determines whether any further geometric shapes are to be processed. That is, the DBMS determines if any further rows in the table holding the geometric shapes remain to be processed in computing the union of shapes. If further geometric shapes remain in the DBMS table that have not been used in computing the union, the DBMS, in operation 212, passes the next entity to be processed, in this example a geometric shape, to the ComputeAggregate function. The operation is again performed combining the next shape to be processed with the intermediate result, and a new identifier for the now new intermediate result is returned and stored in the DBMS.

The loop defined by operations 204, 206, 208, 210 and 212 builds up the aggregate in memory. After each identifier is returned to the database system, it is determined if the union of all entities has been computed, as depicted by operation 210. If not, and one or more entities have yet to be included in the union, the next entity is input as depicted by operation 212. If, on the other hand, it is determined in operation 210 that no further geometric shapes are to be used in the computation of the union, the DBMS function MAX is applied in operation 214 to find the identifier with the maximum counter value, which corresponds to the last computed intermediate result. The counter is ever-increasing, so the maximum identifier always corresponds to the last computed intermediate result. On the other hand, if the counter had been arranged to count down from some finite number, it is the minimum that would be sought rather than the maximum. It should be understood that the word "maximum" as used herein should be construed as meaning "minimum" if such an alternative arrangement is employed.

Once the identifier with the maximum count value is determined, the identifier is provided to the GetAggregate Result function 201. The GetAggregateResult function, using the pointer in the identifier, retrieves the aggregate result from the memory and returns it to the DBMS. As part of that function, the identifier is verified and decomposed into the counter and pointer portions, as depicted in operation 216. Depending on the information carried in the pointer and/or "additional information" portion of the identifier, additional verifications such as the host name and process ID might be performed. Once the pointer is obtained, the respective memory area is accessed and the final aggregation result is returned to the DBMS, as indicated in operation 211. The process then returns, in operation 220, to the calling application.

It should be understood that while in the preferred embodiment the aggregate is built up by adding one entity at a time, if the database function permits, a union of more than one entity at a time may be effected, and the present invention encompasses such arrangements. Also, while the embodiments described above relate to computing a union of geometric shapes, other combinations of entities stored in a database can be computed using the techniques described here.

Figure 4:
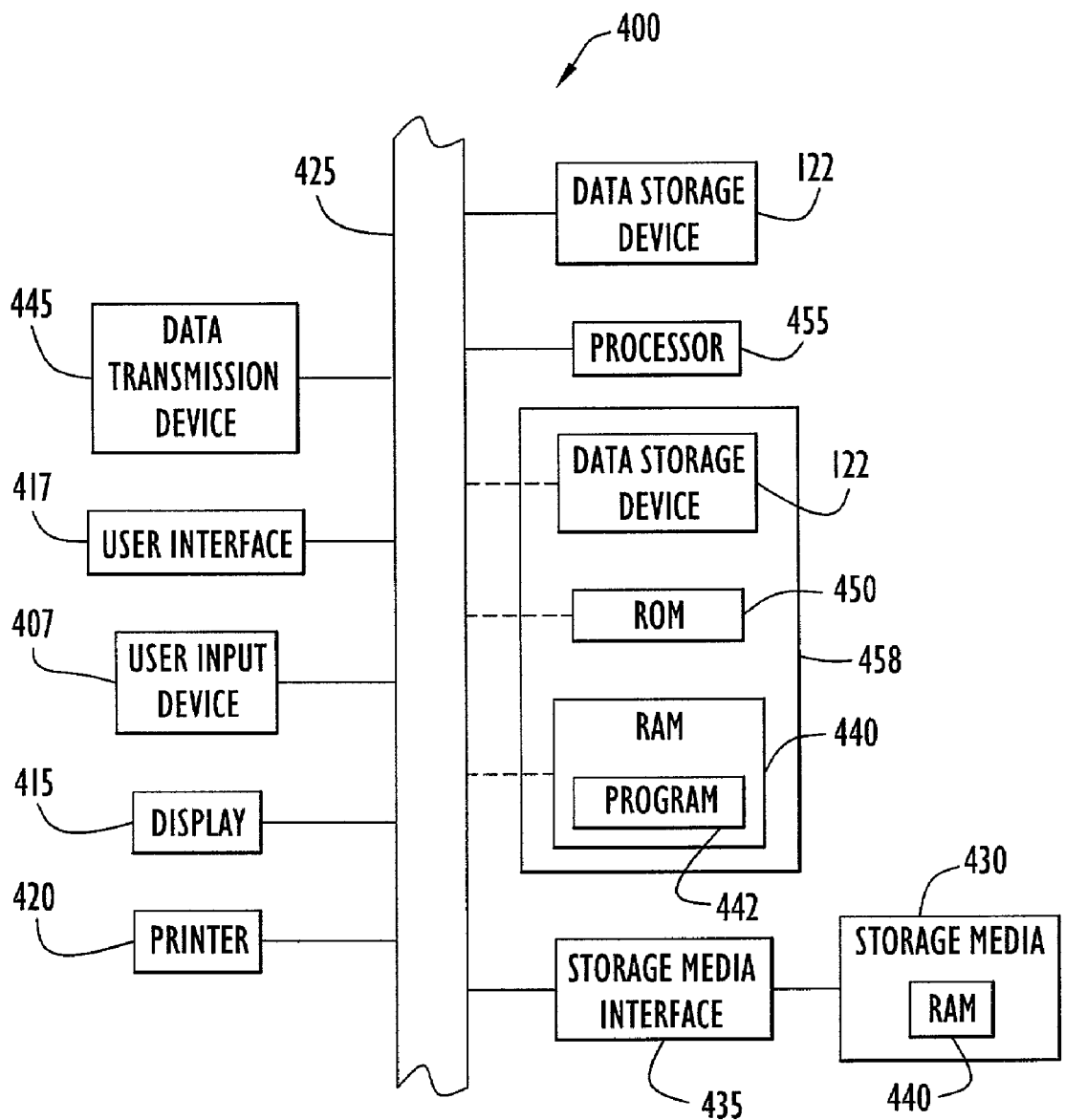
FIG. 4 is a block diagram of a computer system suitably configured for operation of the present invention.

FIG. 4 is a block diagram of a computer system 400, suitable for employment of the present invention. System 400 can be implemented on a general-purpose microcomputer, such as one of the members of the IBM Personal Computer family, or other conventional workstation or graphics computer devices, or mainframe computers. In its preferred embodiment, system 400 includes a user interface 417, a user input device 407, a display 415, a printer 420, a processor 455, a read only memory (ROM) 450, a data storage device 122, such as a hard drive, memory/440 such as a random access memory (RAM), and a storage media interface 435, all of which are coupled to a bus 425 or other communication means for communicating information. Although system 400 is represented herein as a standalone system, it is not limited to such, but instead can be part of a networked system. For example, the computer system 400 may be connected locally or remotely to fixed or removable data storage devices 122 and data transmission devices 445. Further the computer system 400, such as the server computer system 102 or the client computer system 104, also could be connected to other computer systems via the data transmission devices 445.

The memory 440, the data storage device 122 and the ROM 450, are components of a means 458 that stores data and instructions for controlling the operation of processor 455, which may be configured as a single processor or as a plurality of processors. The processor 455 executes a program 442 recorded in one of the computer-readable storage media described above, to perform the methods of the present invention, as described herein.

While the program 442 is indicated as loaded into the RAM 440, it may be configured on a storage media 430 for subsequent loading into the data storage device 122, the ROM 450, or the RAM 440 via an appropriate storage media interface 435. Storage media 430 can be any conventional storage media such as a magnetic tape, an optical storage media, a compact disk, or a floppy disk. Alternatively, storage media 430 can be a random access memory 440, or other type of electronic storage, located on a remote storage system. The term "memory" herein in which the aggregate is built up typically refers to a non-persistent memory such as a random access memory (RAM) 440 although persistent memory also can be used. Other memory devices described herein can also be used, although access time may be increased.

Generally, the computer programs and operating systems are all tangibly embodied in a computer-readable device or media, such as the memory 458, the data storage device 122, or the data transmission devices 445, thereby making an article of manufacture, such as a computer program product. As such, the terms "computer program product" as used herein are intended to encompass a computer program 442 accessible from any computer readable device or media.

Moreover, the computer programs 442 and operating systems are comprised of instructions which, when read and executed by the computer system 400, cause the computer system 400 to perform the steps necessary to implement and use the methods and systems described here. Under control of the operating system, the computer programs 442 may be loaded from the memory 458, the data storage device 122, or the data transmission devices 445 into the memories 458 of the computer system 400 for use during actual operations. Those skilled in the art will recognize many modifications may be made to this configuration without departing from the scope of the present invention.

The user interface 417 is an input device, such as a keyboard or speech recognition subsystem, for enabling a user to communicate information and command selections to the processor 455. The user can observe information generated by the system 400 via the display 415 or the printer 420. The user input device 407 is a device such as a mouse, track-ball, or joy-stick, which allows the user to manipulate a cursor on the display 415 for communicating additional information and command selections to the processor 455.

The methods and systems described here are typically implemented using one or more computer programs 442, each of which is executed under the control of an operating system and causes the system 400 to perform the desired functions as described herein. Thus, using the present specification, the invention may be implemented as a machine, process, method, system, or article of manufacture by using standard programming and engineering techniques to produce software, firmware, hardware or any combination thereof.

Having described apparatuses, articles of manufacture and methods of manipulating information contained in a database system, it is believed that other modifications, variations and changes will be suggested to those skilled in the art in view of the teachings set forth herein. It is therefore to be understood that all such variations, modifications and changes are believed to fall within the scope of the present invention as defined by the appended claims. Although specific terms are employed herein, they are used in their ordinary and accustomed manner only, unless expressly defined differently herein, and not for purposes of limitation.

TRADEMARKS

IBM is a trademark or registered trademark of International Business Machines, Corporation in the United States and other countries.

DB2 is a trademark or registered trademark of International Business Machines, Corporation in the United States and other countries.

What is claimed is:

1. A computer-implemented method of generating an aggregate of a plurality of entities stored in a relational storage structure in a database management system (DBMS), the DBMS having a plurality of predefined DBMS functions, the method comprising:
   with the use of one of the predefined DBMS functions, constructing an aggregate of said plurality of entities in a variable stored in a memory to provide a result, comprising computing a combination of an input entity from the plurality of entities and a value stored in the variable, wherein the value stored in the variable is a combination of at least two of the plurality of entities, to provide the result in the memory, wherein the variable and the relational storage structure are different storage structures;
   assigning an identifier to the result stored in the memory wherein the identifier contains information suitable for locating the result in the memory;
   using said one of the predefined DBMS functions to locate the result before returning the result from the memory; and
   returning the result from the memory.

2. The computer-implemented method of claim 1, wherein the identifier is returned to the DBMS.

3. The computer-implemented method of claim 1, wherein the DBMS comprises a database containing the relational storage structure which comprises one or more tables, wherein the identifier is stored in a table in the database, and the memory is external to the database.

4. The computer-implemented method of claim 3, wherein using said one of the predefined DBMS functions to identify the result before returning the result from the memory to the DBMS comprises finding an identifier that corresponds to a final computed result.

5. The computer-implemented method of claim 4, further comprising determining whether all of the plurality of entities have been used in constructing the aggregate, wherein said finding the identifier that corresponds to the final computed result is performed after all said plurality of entities have been used in generating the aggregate.

6. The computer-implemented method of claim 5, wherein if it is determined that all of the plurality of entities have not been used in generating the aggregate, inputting entities from the DBMS for computation until all the plurality of entities have been used in computing the aggregate.

7. The computer-implemented method of claim 6, wherein the identifier which is associated with the result in memory is comprised of a counter having a count value indicative of the result and a pointer that indicates a location in the memory where the result is stored.

8. The computer-implemented method of claim 7, wherein finding the identifier that corresponds to the final computed result comprises finding an identifier having a maximum count value.

9. The computer-implemented method of claim 8, further comprising decomposing the identifier having the maximum count value into its counter and pointer and using the pointer to access the result in the memory.

10. The computer-implemented method of claim 7, wherein finding the identifier that corresponds to the final computed result comprises finding an identifier having a minimum count value.

11. The computer-implemented method of claim 10, further comprising decomposing the identifier having the minimum count value into its counter and pointer and using the pointer to access the result in the memory.

12. The computer-implemented method of claim 1, wherein the plurality of entities are geometric shapes.

13. A computer-implemented method of generating an aggregate of a plurality of entities stored in a database, comprising:
   successively computing a combination of an entity among the plurality of entities and an intermediate result comprising a combination of other entities among the plurality of entities to provide a new intermediate result and storing the new intermediate result in a memory;
   for each new intermediate result, assigning an identifier that includes a value that is greater than a value associated with an identifier of the preceding intermediate result;
   determining a final aggregated result by finding an identifier having a maximum value among the plurality of identifiers; and
   using the determined identifier having the maximum value to access the final aggregated result from the memory.

14. The computer-implemented method of claim 13, wherein the combination of entities is computed using a union operation.

15. The computer-implemented method of claim 14, further comprising determining whether all of the plurality of entities have been computed in the union, wherein finding the identifier that corresponds to the final aggregated result is performed in response to all of the plurality of entities being used in the computation of the union.

16. The computer-implemented method of claim 15, wherein each of the plurality of identifiers is comprised of a counter that indicates the value of one of the intermediate results and a pointer that indicates a location in the memory where the intermediate result is stored.

17. The computer-implemented method of claim 13, wherein the plurality of entities are geometric shapes.

18. A computer system for providing an aggregate of a plurality of entities, comprising:
    a memory configured for storing a variable; and
    a database management system (DBMS) having stored therein in a relational data structure the plurality of entities, and configured to generate an aggregate of said plurality of entities, to store the aggregate in the variable in the memory to provide a result, to generate an identifier for each generated aggregate stored in the variable in the memory, to find an identifier corresponding to the final computed result stored in the memory and to return the final result from the memory.

19. The computer system of claim 18, wherein the DBMS locates the result before returning it from the memory to the DBMS.

20. The computer system of claim 19, wherein the DBMS is configured to generate the aggregate by combining an input entity among the plurality of entities with the aggregate stored in the variable in the memory.

21. The computer system of claim 20, wherein the aggregate stored in the variable is a union of entities among the plurality of entities.

22. The computer system of claim 21, wherein the DBMS records the generated identifier in a table in the DBMS.

23. The computer system of claim 22, wherein the DBMS is configured to determine whether all of the plurality of entities have been combined in the aggregate, and to find the final computed result in response to determining that all of the plurality of entities have been combined.

24. The computer system of claim 23, wherein if it is determined that all of the plurality of entities have not been used in computing the aggregate, the DBMS inputs a next entity from among the plurality of entities until it is determined that each of the plurality of entities has been used in computing the aggregate.

25. The computer system of claim 24, wherein the identifier for each generated result is comprised of a counter that indicates a value of the corresponding result and a pointer that indicates a location in the memory where the result is stored, and wherein the DBMS is configured to find a final computed result by finding the identifier having a maximum value.

26. The computer system of claim 25, wherein the DBMS is configured to decompose the identifier having the maximum value into its counter and pointer in response to finding the identifier having the maximum value to access the final computed result stored in the memory.

27. The computer system of claim 24, wherein the identifier for each generated result is comprised of a counter that indicates a value of the corresponding result and a pointer that indicates a location in the memory where the result is stored, and wherein the DBMS is configured to find a final computed result by finding the identifier having a minimum value.

28. The computer system of claim 27, wherein the DBMS is configured to decompose the identifier having the minimum value into its counter and pointer in response to finding the identifier having the minimum value to access the final computed result stored in the memory.

29. The computer system of claim 18, wherein the plurality of entities are geometric shapes.

30. A computer program embodied on a computer readable medium, for generating an aggregate of a plurality of entities stored in a database, the computer program comprising:
    program instructions for successively computing a combination of an entity among the plurality of entities and an intermediate result comprising a combination of other entities among the plurality of entities to provide a new intermediate result, and storing the new intermediate result in a memory;
    program instructions for assigning an identifier for the new intermediate result, wherein the identifier includes a value that is greater than a value associated with an identifier of the preceding intermediate result;
    program instructions for determining a final aggregated result by finding an identifier having a maximum value among the plurality of identifiers; and
    program instructions for accessing the final aggregated result from the memory by using the determined identifier having the maximum value.

31. The computer program of claim 30, wherein each of the plurality of identifiers is comprised of a counter that indicates the value of an intermediate result and a pointer that indicates a location in the memory where the intermediate result is stored, and the identifier having a maximum value is found by applying a predefined maximum function to the plurality of identifiers to determine the identifier having a maximum count value.

32. The computer program of claim 30, wherein the plurality of entities are geometric shapes.

33. A computer-implemented method of generating an aggregate of a plurality of entities stored in a database, comprising:
    successively computing a combination of an entity among the plurality of entities and an intermediate result comprising a combination of other entities among the plurality of entities to provide a new intermediate result and storing the new intermediate result in a memory;
    for each new intermediate result, assigning an identifier that includes a value that is less than a value associated with an identifier of the preceding intermediate result;
    determining a final aggregated result by finding an identifier having a minimum value among the plurality of identifiers; and
    using the determined identifier having the minimum value to access the final aggregated result from the memory.

34. The computer-implemented method of claim 33, wherein the combination of entities is computed using a union operation.

35. The computer-implemented method of claim 34, further comprising determining whether all of the plurality of entities have been computed in the union, wherein finding the identifier that corresponds to the final aggregated result is performed in response to all of the plurality of entities being used in the computation of the union.

36. The computer-implemented method of claim 35, wherein each of the plurality of identifiers is comprised of a counter that indicates the value of one of the intermediate results and a pointer that indicates a location in the memory where the intermediate result is stored.

37. The computer-implemented method of claim 33, wherein the plurality of entities are geometric shapes.

38. A computer program embodied on a computer readable medium, for generating an aggregate of a plurality of entities stored in a database, the computer program comprising:

program instructions for successively computing a combination of an entity among the plurality of entities and an intermediate result comprising a combination of other entities among the plurality of entities to provide a new intermediate result and storing the new intermediate result in a memory;

program instructions for assigning an identifier for the new intermediate result, wherein the identifier includes a value that is less than a value associated with an identifier of the preceding intermediate result;

program instructions for determining a final aggregated result by finding an identifier having a minimum value among the plurality of identifiers; and program instructions for accessing the final aggregated result from the memory by using the determined identifier having the minimum value.

39. The computer program of claim 38, wherein each of the plurality of identifiers is comprised of a counter that indicates the value of an intermediate result and a pointer that indicates a location in memory where the intermediate result is stored, and the identifier having a minimum value is found by applying a predefined minimum function to the plurality of identifiers to determine the identifier having a minimum count value.

40. The computer program of claim 38, wherein the plurality of entities are geometric shapes.

* * * * *